United States Patent
Muraoka et al.

(10) Patent No.: US 11,415,240 B2
(45) Date of Patent: Aug. 16, 2022

(54) POPPET-TYPE FLOW CONTROL VALVE

(71) Applicant: KAWASAKI JUKOGYO KABUSHIKI KAISHA, Kobe (JP)

(72) Inventors: Hideyasu Muraoka, Akashi (JP); Hideki Tanaka, Nishinomiya (JP); Hiroaki Shimizu, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/050,713

(22) PCT Filed: Apr. 18, 2019

(86) PCT No.: PCT/JP2019/016619
§ 371 (c)(1),
(2) Date: Oct. 26, 2020

(87) PCT Pub. No.: WO2019/208385
PCT Pub. Date: Oct. 31, 2019

(65) Prior Publication Data
US 2021/0239231 A1 Aug. 5, 2021

(30) Foreign Application Priority Data
Apr. 26, 2018 (JP) ............................. JP2018-085463

(51) Int. Cl.
F16K 31/04 (2006.01)
F16K 1/36 (2006.01)

(52) U.S. Cl.
CPC .............. F16K 31/04 (2013.01); F16K 1/36 (2013.01)

(58) Field of Classification Search
CPC .................................. F16K 31/04; F16K 1/36
See application file for complete search history.

(56) References Cited

U.S. PATENT DOCUMENTS 4,779,837 A 10/1988 Mito et al.
4,852,853 A * 8/1989 Toshio ................ F16K 31/0693
251/129.07

(Continued)

FOREIGN PATENT DOCUMENTS

JP S62-188878 A 8/1987
JP H02-57771 A 2/1990

(Continued)

Primary Examiner — Eric Keasel
(74) Attorney, Agent, or Firm — Oliff PLC

(57) ABSTRACT

A poppet-type flow control valve includes: a valve housing including an inlet passage, an outlet passage, a valve chamber provided between the inlet passage and the outlet passage, and a valve seat provided in the valve chamber; a valve body accommodated in the valve housing and configured to advance and retract relative to the valve seat; a piston configured to move integrally with the valve body in an advancing and retracting direction, in which the valve body advances and retracts; a movable member movable in the advancing and retracting direction, in which the valve body advances and retracts, the movable member being configured to move integrally with the valve body at least when the movable member moves in a retracting direction of the advancing and retracting direction; an electric motor; a position detector configured to detect a rotational angle of an output shaft of the electric motor; a linear motion conversion mechanism configured to convert a rotation amount of the output shaft of the electric motor into a linear motion displacement of the piston in the advancing and retracting direction; and a controller configured to perform feedback control of the electric motor, such that the rotational angle of the output shaft, which is detected by the position detector, is adjusted to a rotational angle corresponding to a predetermined target distance between the valve seat and the valve body.

2 Claims, 7 Drawing Sheets

(56) References Cited

U.S. PATENT DOCUMENTS

| | | | | |
|---|---|---|---|---|
| 6,250,602 | B1* | 6/2001 | Jansen | F02K 9/58 |
| | | | | 251/903 |
| 8,118,276 | B2* | 2/2012 | Sanders | G05B 19/39 |
| | | | | 251/129.04 |
| 2007/0210270 | A1 | 9/2007 | Stephenson et al. | |

FOREIGN PATENT DOCUMENTS

| | | |
|---|---|---|
| JP | H02-283986 A | 11/1990 |
| JP | 2003-014152 A | 1/2003 |
| JP | 2007-239996 A | 9/2007 |
| JP | 2016-156447 A | 9/2016 |

* cited by examiner

POPPET-TYPE FLOW CONTROL VALVE

TECHNICAL FIELD

The present invention relates to a poppet-type flow control valve.

BACKGROUND ART

Conventionally, various poppet-type flow control valves have been developed, each of which is configured such that a valve body thereof advances and retracts relative to a valve seat, and thereby the flow rate of a fluid passing between the valve body and the valve seat is controlled.

For example, Patent Literature 1 discloses a pilot-operated poppet-type flow control valve in which a valve seat is provided to one side of a valve body, and a control chamber is provided to the other side of the valve body. By controlling the pressure in the control chamber, a flow rate between first and second ports is controlled selectively. The poppet-type flow control valve of Patent Literature 1 includes: a pilot passage through which the control chamber and the second port communicate with each other; and a pilot valve body that operates in a manner to open and close the pilot passage. The pilot passage has an opening that is adjusted as a result of a solenoid actuator causing the pilot valve body to operate. When the opening of the pilot passage reaches a predetermined size, the valve body becomes spaced apart from the valve seat.

CITATION LIST

Patent Literature

PTL 1: Japanese Laid-Open Patent Application Publication No. 2007-239996

SUMMARY OF INVENTION

Technical Problem

In the case of the above-described poppet-type flow control valve, in order to control the flow rate of the fluid passing between the valve body and the valve seat, the flow rate of the fluid passing through the pilot passage is controlled, i.e., flow rate control of a low flow rate region is performed, thereby controlling the pressure in the control chamber. However, precise flow rate control of the low flow rate region is difficult since the pressure in the control chamber easily changes due to slight flow rate variations. In order to perform positioning of the valve body with high precision, there is a demand for a poppet-type flow control valve that adopts a method different from the control chamber pressure control.

In view of the above, an object of the present invention is to provide a poppet-type flow control valve capable of performing positioning of the valve body with higher precision.

Solution to Problem

In order to solve the above-described problems, a poppet-type flow control valve according to the present invention includes: a valve housing including an inlet passage, an outlet passage, a valve chamber provided between the inlet passage and the outlet passage, and a valve seat provided in the valve chamber; a valve body accommodated in the valve housing and configured to advance and retract relative to the valve seat; a movable member configured to move integrally with the valve body in an advancing and retracting direction, in which the valve body advances and retracts; an electric motor; a position detector configured to detect a rotational angle of an output shaft of the electric motor; a linear motion conversion mechanism configured to convert a rotation amount of the output shaft of the electric motor into a linear motion displacement of the movable member in the advancing and retracting direction; and a controller configured to perform feedback control of the electric motor, such that the rotational angle of the output shaft, which is detected by the position detector, is adjusted to a rotational angle corresponding to a predetermined target distance between the valve seat and the valve body.

According to the above configuration, positioning of the valve body is performed by the feedback control of the electric motor. Therefore, positioning of the valve body relative to the valve seat can be performed with high precision.

The above poppet-type flow control valve may include: a back pressure chamber formed in the valve housing, such that the back pressure chamber is positioned to the retracting direction side of the valve body and is partitioned off from the valve chamber by the valve body; and a communication passage through which the inlet passage and the back pressure chamber communicate with each other, the communication passage being configured to equalize a fluid pressure in the inlet passage and a fluid pressure in the back pressure chamber to each other. According to this configuration, a force against a force applied to the valve body in the retracting direction can be applied to the valve body in the advancing direction by the fluid pressure in the back pressure chamber, which is equal to the fluid pressure in the inlet passage. This makes it possible to reduce a necessary thrust of the electric motor for causing the valve body to act in the advancing direction.

In the above poppet-type flow control valve, the valve seat may be provided around an opening of the inlet passage to the valve chamber, and the valve housing and the valve body may be formed such that a pressure receiving area on the back pressure chamber side of the valve body is greater than a pressure receiving area on the inlet passage side of the valve body. According to this configuration, the force applied to the valve body in the advancing direction by the fluid pressure in the back pressure chamber can be made greater than the force applied to the valve body in the retracting direction by the fluid pressure in the inlet passage. Consequently, even though the valve seat is provided around the opening of the inlet passage to the valve chamber, the valve body can be caused to act in the advancing direction by the fluid pressure in the back pressure chamber. In addition, keeping a valve-closed state in which the valve body is in contact with the valve seat does not require a thrust of the electric motor. Therefore, electric power consumption for keeping the valve-closed state can be made substantially zero.

In the above poppet-type flow control valve, the communication passage may be formed in the valve body. This configuration makes it possible to simplify the configuration of the valve housing and prevent the overall poppet-type flow control valve from becoming large-sized.

The above poppet-type flow control valve may include a biasing member configured to apply a biasing force to the valve body in the advancing direction. When a fluid pressure in the inlet passage becomes lower than a fluid pressure in the outlet passage and a force applied to the valve body in the retracting direction becomes greater than a force applied to the valve body in the advancing direction, the valve body may move in the retracting direction relative to the movable member.

For example, in the case of using the flow control valve for controlling a hydraulic cylinder configured to drive an element to which its own weight is applied, for example, the boom of an excavator, if the supply flow rate to the hydraulic cylinder is insufficient, then the higher-lower relationship between the inlet pressure and the outlet pressure of the flow control valve may become reversed, and as a result, the inlet pressure may become lower than the outlet pressure. According to the above configuration, when the supply flow rate to the hydraulic cylinder is insufficient, the inlet pressure becomes lower than the outlet pressure, and consequently, the force applied to the valve body in the retracting direction becomes greater than the force applied to the valve body in the advancing direction. At the time, the valve body moves in the retracting direction to become spaced apart from the valve seat, which makes it possible to replenish the inlet passage with the fluid from the outlet passage.

In the above poppet-type flow control valve, in which the valve body moves in the retracting direction relative to the movable member, the movable member may include an engagement portion configured to be engaged with the valve body. The valve body may include a contact portion configured to be contacted by the engagement portion from the advancing direction side. When the fluid pressure in the inlet passage is higher than the fluid pressure in the outlet passage, the engagement portion may be kept in contact with the contact portion. When the fluid pressure in the inlet passage becomes lower than the fluid pressure in the outlet passage and the force applied to the valve body in the retracting direction becomes greater than the force applied to the valve body in the advancing direction, the contact portion may become spaced apart from the engagement portion, and the valve body may move in the retracting direction relative to the movable member.

Advantageous Effects of Invention

The present invention makes it possible to provide a poppet-type flow control valve capable of performing positioning of the valve body with higher precision.

DESCRIPTION OF EMBODIMENTS

Next, schematic configurations of poppet-type flow control valves according to embodiments of the present invention are described with reference to the drawings.

Embodiment 1

Figure 1:
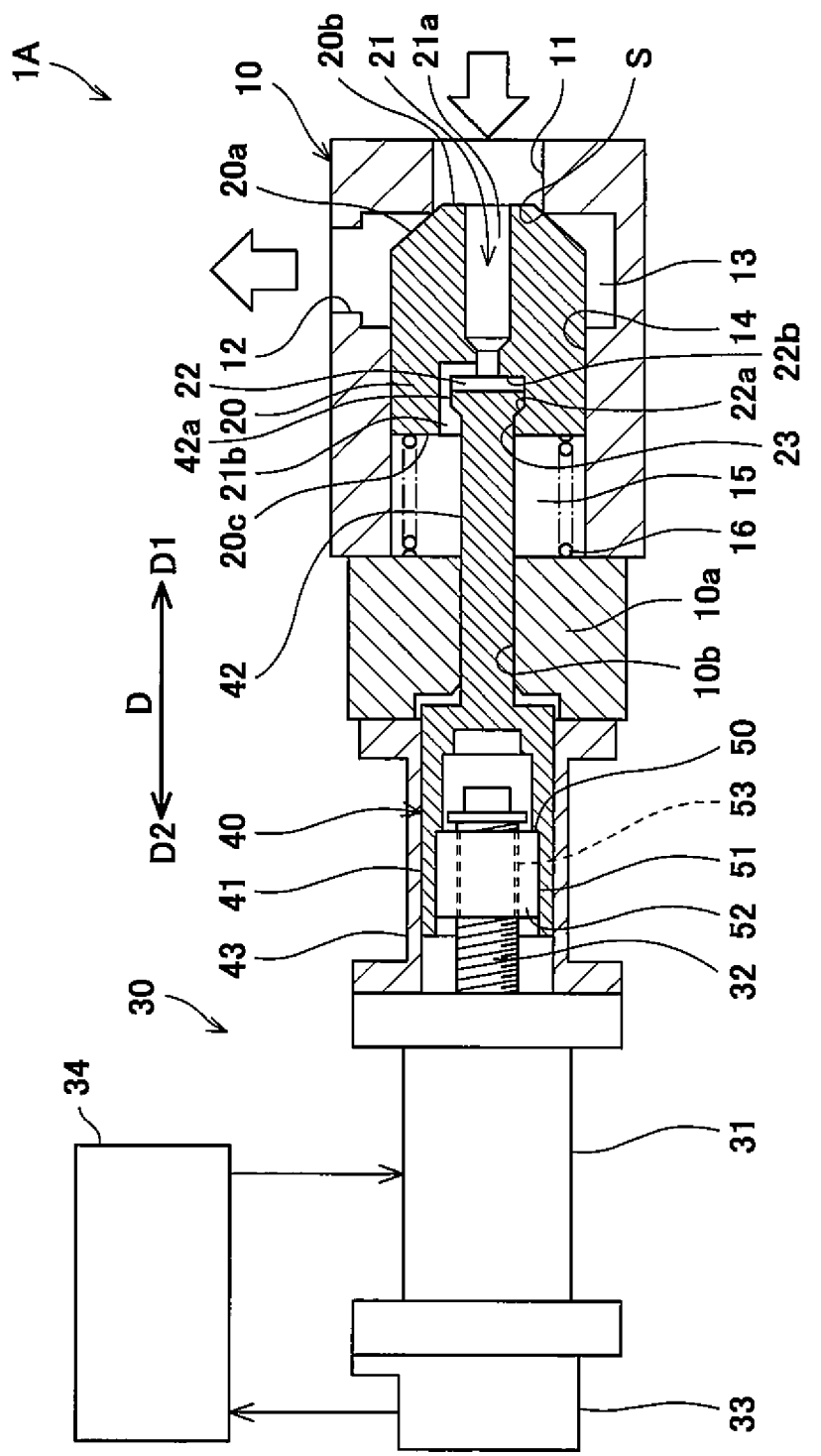
FIG. 1 shows a schematic configuration of a poppet-type flow control valve according to Embodiment 1 of the present invention.

FIG. 1 shows a schematic configuration of a poppet-type flow control valve (which is hereinafter referred to as "flow control valve") 1 according to Embodiment 1. The flow control valve 1A includes a valve housing 10, a poppet-type valve body 20, and a valve body drive unit 30.

The valve housing 10 includes: an inlet passage 11, which is an inlet port passage; an outlet passage 12, which is an outlet port passage; and a valve chamber 13 interposed between the inlet passage 11 and the outlet passage 12. The valve chamber 13 is provided with a valve seat S. The valve housing 10 accommodates therein the valve body 20, which has a substantially columnar shape. The valve body 20 is configured to advance and retract relative to the valve seat S. The valve body 20 advances and retracts in a direction orthogonal to the valve seat S. The inlet passage 11 extends from the valve chamber 13 in a direction in which the valve body 20 moves toward the valve seat S. The outlet passage 12 extends from the valve chamber 13 in a direction orthogonal to the direction in which the valve body 20 moves toward the valve seat S. The valve seat S is provided around an opening of the inlet passage 11 to the valve chamber 13. In the present embodiment, a cylindrical sliding surface 14 is formed in the valve housing 10. The cylindrical sliding surface 14 supports the valve body 20, such that the valve body 20 is slidable in an advancing and retracting direction D of the valve body 20.

In the description below, the advancing and retracting direction D of the valve body 20 is further defined into the following two directions: "advancing direction D1" and "retracting direction D2". The "advancing direction D1" is the direction in which the valve body 20 moves toward the valve seat S, and "the retracting direction D2" is the direction opposite to the advancing direction D1.

At a normal time, the valve body 20 of the flow control valve 1A is in a valve-closed state in which the valve body 20 is seated on (i.e., in contact with) the valve seat S as shown in FIG. 1. In the present embodiment, an end portion of the advancing direction D1 side of the valve body 20 is tapered such that the diameter of the end portion is reduced toward the advancing direction D1. As a result of a tapered surface 20a of the valve body 20 coming into contact with the valve seat S, the inlet passage 11 is sealed from the valve chamber 13. Consequently, a flow of a fluid from the inlet passage 11 to the outlet passage 12 is blocked.

A back pressure chamber 15 is formed in the valve housing 10, such that the back pressure chamber 15 is positioned to the retracting direction D2 side of the valve body 20. The back pressure chamber 15 is partitioned off from the valve chamber 13 by the valve body 20. That is, the valve body 20 is positioned between the valve chamber 13 and the back pressure chamber 15. The fluid is led from the inlet passage 11 into the back pressure chamber 15. To be more specific, in the valve body 20, a communication passage 21 is formed, through which the inlet passage 11 and the back pressure chamber 15 communicate with each other when the valve body 20 is in contact with the valve seat S.

The communication passage 21 allows the inlet passage 11 and the back pressure chamber 15 to communicate with each other, and allows the fluid to be supplied from the inlet passage 11 to the back pressure chamber 15. In this manner, the communication passage 21 brings the fluid pressure in the inlet passage 11 and the fluid pressure in the back pressure chamber 15 to be equal to each other.

In the present embodiment, the valve housing 10 and the valve body 20 are formed such that a pressure receiving area S1 on the back pressure chamber 15 side of the valve body 20 is greater than a pressure receiving area S2 on the inlet passage 11 side of the valve body 20 when the valve body 20 is in contact with the valve seat S.

To be more specific, the valve housing 10 and the valve body 20 are formed such that when the valve body 20 is in contact with the valve seat S, the pressure receiving area S1 of the valve body 20, which receives the fluid pressure in the back pressure chamber 15 and to which a load in the advancing direction D1 is applied, is greater than the pressure receiving area S2 of the valve body 20, which receives the fluid pressure in the inlet passage 11 and to which a load in the retracting direction D2 is applied. In other words, when a cross section of a shaft portion 42 and a cross section of the back pressure chamber 15 are taken perpendicularly to the advancing and retracting direction D of the valve body 20, a value that is obtained by subtracting the area of the cross section of the shaft portion 42 from the area of the cross section of the back pressure chamber 15 is greater than the area of a cross section of the inlet passage 11 taken perpendicularly to the advancing and retracting direction D of the valve body 20. The shaft portion 42 will be described below. In this manner, a force that is applied to the valve body 20 in the advancing direction D1 by the fluid pressure in the back pressure chamber 15 when the valve body 20 is in contact with the valve seat S is set to be greater than a force that is applied to the valve body 20 in the retracting direction D2 by the fluid pressure in the inlet passage 11 when the valve body 20 is in contact with the valve seat S.

It should be noted that not only when the valve body 20 is in contact with the valve seat S, but also when the valve body 20 is spaced apart from the valve seat S by a slight distance, the force applied to the valve body 20 in the advancing direction D1 by the fluid pressure is greater than the force applied to the valve body 20 in the retracting direction D2 by the fluid pressure. The reason for this is that when the valve body 20 is spaced apart from the valve seat S by a slight distance, there is a pressure difference between the inlet passage 11 and the outlet passage 12, and consequently, the pressure receiving area S1 receiving the force applied to the valve body 20 in the advancing direction D1 is greater than the pressure receiving area S2 receiving the force applied to the valve body 20 in the retracting direction D2.

Further, in the back pressure chamber 15, a biasing member 16 is provided, which is configured to apply a biasing force in the advancing direction D1 to the valve body 20. The biasing member 16 is, for example, a compressed coil spring.

The valve body drive unit 30 controls the position of the valve body 20 by driving the valve body 20 in contact with the valve seat S in the retracting direction D2. When the valve body 20 in contact with the valve seat S moves in the retracting direction D2 and becomes spaced apart from the valve seat S, the fluid flows from the inlet passage 11 to the outlet passage 12 through the valve chamber 13 at a flow rate corresponding to the space between the valve body 20 and the valve seat S.

The valve body drive unit 30 includes: an electric motor 31; a position detector 33 configured to detect the rotational angle of an output shaft 32 of the electric motor 31; and a controller 34 configured to servo-control the electric motor 31 based on a detected value outputted from the position detector 33. That is, the electric motor 31 is a servomotor. The position detector 33 is, for example, a resolver. However, the position detector 33 is not limited to a resolver, but may be, for example, an encoder or a Hall element.

Further, the valve body drive unit 30 includes: a piston (corresponding to "a movable member" of the present invention) 40 configured to move integrally with the valve body 20 in the advancing and retracting direction D; and a linear motion conversion mechanism 50 configured to convert a rotation amount of the output shaft 32 of the electric motor 31 into a linear motion displacement of the piston 40 in the advancing and retracting direction D.

The piston 40 has an overall columnar shape extending parallel to the advancing and retracting direction D. The piston 40 includes a cylindrical portion 41 and the aforementioned shaft portion 42. The cylindrical portion 41 is provided on the retracting direction D2 side of the piston 40, and the shaft portion 42 is provided on the advancing direction D1 side of the piston 40. The cylindrical portion 41 and the shaft portion 42 are formed integrally.

The cylindrical portion 41 of the piston 40 is a bottomed roughly cylindrical portion that is open in the retracting direction D2. The cylindrical portion 41 is inserted in a substantially cylindrical cylinder 43, which is coupled to the valve housing 10. Specifically, the cylinder 43 is coupled to a wall portion 10*a*, which seals the retracting direction D2 side of the back pressure chamber 15. It should be noted that the inner circumferential surface of the cylinder 43 and the outer circumferential surface of the piston 40 need not be in contact with each other, and a gap may be formed between the inner circumferential surface of the cylinder 43 and the outer circumferential surface of the piston 40.

An end portion of the retracting direction D2 side of the cylinder 43 is coupled to a flange of the electric motor 31. The output shaft 32 of the electric motor 31 extends in the advancing and retracting direction D, and is inserted in the cylindrical portion 41 of the piston 40. The output shaft 32 is a screw shaft provided with a male screw 51, which is formed on the outer circumferential surface of the output shaft 32. A nut 52 is fixed to the inner circumferential wall of the cylindrical portion 41 of the piston 40. The nut 52 is provided with a female screw 53, which is formed on the inner wall of the nut 52. The male screw 51 of the output shaft 32 is screwed into the female screw 53.

The linear motion conversion mechanism 50 further includes an unshown rotation prevention mechanism configured to prevent rotation of the piston 40 about the shaft relative to the cylinder 43. Specifically, a protrusion that protrudes in the radial direction is formed on the outer circumferential surface of the cylindrical portion 41, and also, a groove that is parallel to the advancing and retracting direction D is formed in the inner circumferential surface of the cylinder 43 (the protrusion and the groove are not shown). The rotation prevention mechanism is constituted by the protrusion and the groove. As a result of the protrusion of the outer circumferential surface of the cylindrical portion 41 being fitted in the groove of the inner circumferential surface of the cylinder 43, the piston 40 is prevented from rotating about the output shaft 32 relative to the cylinder 43. However, the rotation prevention mechanism is not limited to such a configuration. For example, a groove may be formed in the outer circumferential surface of the cylindrical portion 41, and a protrusion that is to be fitted in the groove may be formed on the inner circumferential surface of the cylinder 43.

Since the rotation of the piston 40 relative to the cylinder 43 is thus prevented, when the output shaft 32 of the electric motor 31 rotates, the male screw 51 rotates relative to the female screw 53, and as a result, the nut 52 and the piston 40 integrally make linear motion along the output shaft 32. That is, the linear motion conversion mechanism 50 is a ball screw mechanism that includes the male screw 51 of the output shaft 32 and the nut 52. However, a linear motion conversion mechanism adoptable by the present invention is not limited to this example. The linear motion conversion mechanism may be, for example, a trapezoidal screw, a slide screw, or a rack and pinion.

The shaft portion 42 of the piston 40 extends from the cylindrical portion 41 in the advancing direction D1, and is inserted through a hole 10*b* formed in the wall portion 10*a* of the valve housing 10. An end portion of the advancing direction D1 side of the shaft portion 42 is engaged with the valve body 20. Hereinafter, the manner of engagement of the shaft portion 42 of the piston 40 with the valve body 20 according to the present embodiment is described with reference to FIG. 2A and FIG. 2B.

Figure 2A:
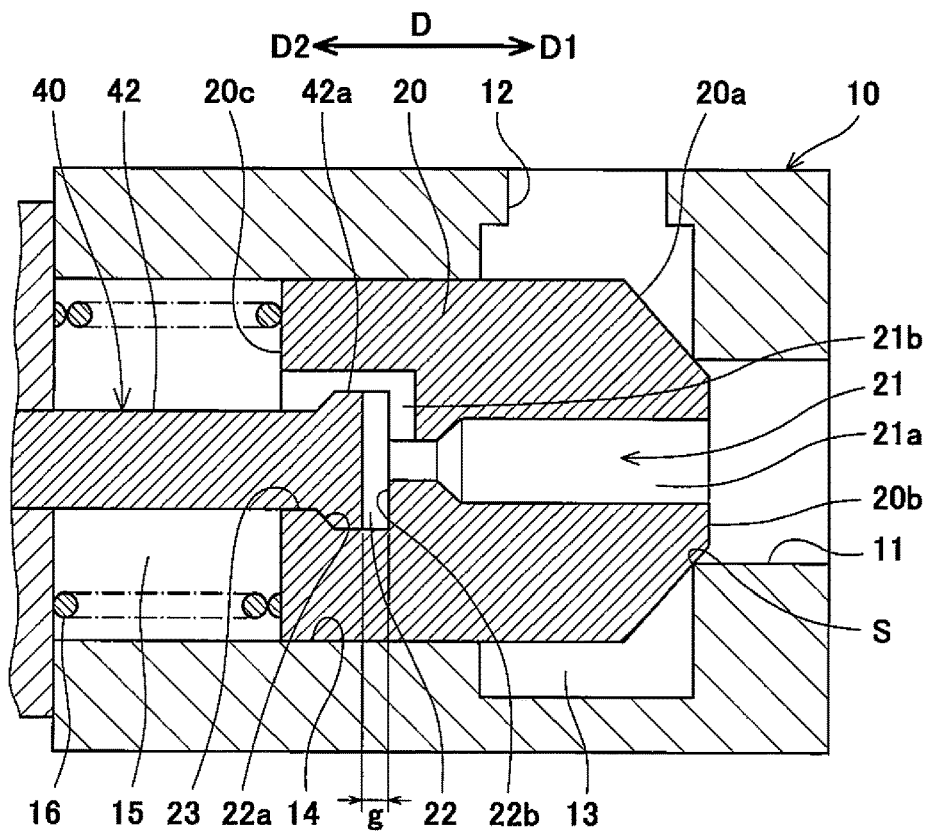
FIG. 2A is an enlarged view of a valve housing and a valve body shown FIG. 1, the view showing a valve-closed state of the flow control valve.
Figure 2B:
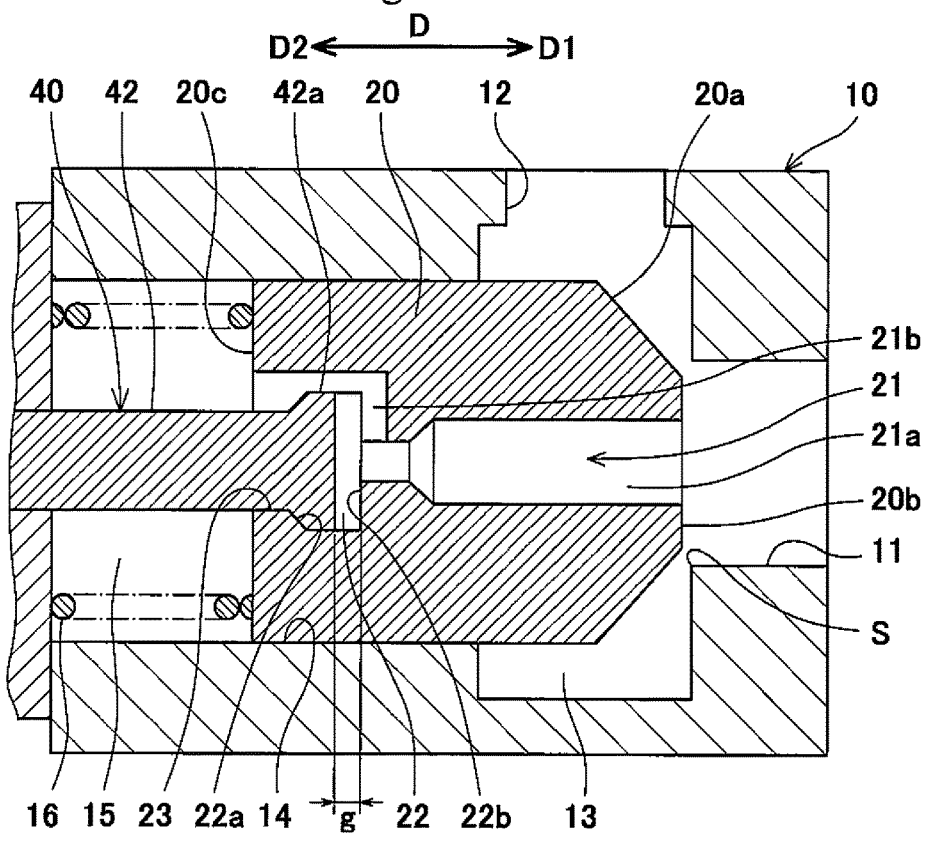
FIG. 2B is an enlarged view of the valve housing and the valve body shown in FIG. 1, the view showing a valve-opened state of the flow control valve.

FIG. 2A and FIG. 2B are enlarged views of the valve body 20 and the valve housing 10 shown in FIG. 1. Similar to FIG. 1, FIG. 2A shows the valve-closed state of the flow control valve 1A. FIG. 2B shows the flow control valve 1A in a valve-opened state in which the valve body 20 is spaced apart from the valve seat S.

The distal end portion of the shaft portion 42 of the piston 40 in the advancing direction D1 is provided with an engagement portion 42*a*, by which the piston 40 comes into engagement with the valve body 20. In the present embodiment, the engagement portion 42*a* protrudes radially outward from the shaft portion 42, and is a substantially columnar portion whose diameter is greater than the diameter of the shaft portion 42. In the valve body 20, an accommodating chamber 22 is formed, in which the engagement portion 42*a* is accommodated. The accommodating chamber 22 is connected to the back pressure chamber 15 via a through-hole 23, which is formed in the valve body 20 and extends in the advancing and retracting direction D. The shaft portion 42 is inserted through the through-hole 23. Since the diameter of the through-hole 23 is less than the diameter of the engagement portion 42*a*, the engagement portion 42*a* is unremovable from the accommodating chamber 22.

In the present embodiment, the valve body 20 is movable in the advancing and retracting direction D relative to the piston 40 within a predetermined range. Specifically, the distance between a wall portion 22*a* of the retracting direction D2 side of the accommodating chamber 22 and a wall portion 22*b* of the advancing direction D1 side of the accommodating chamber 22 is greater than the length of the substantially columnar engagement portion 42*a* in the advancing and retracting direction D. The accommodating chamber 22 is formed such that the engagement portion 42*a* is slidable in the advancing and retracting direction D between the wall portion 22*a* and the wall portion 22*b* of the accommodating chamber 22.

In the present embodiment, the valve body 20 is pressed in the advancing direction D1 at least by the biasing force of the biasing member 16. Accordingly, the wall portion 22*a* of the accommodating chamber 22 is being pressed against the engagement portion 42*a*, and a gap g is formed between the engagement portion 42*a* and the wall portion 22*b* of the accommodating chamber 22. The wall portion 22*a* of the accommodating chamber 22 corresponds to a contact portion of the present invention, which is contacted by the engagement portion 42*a* from the advancing direction D1 side (in other words, the engagement portion 42*a* contacts the wall portion 22*a* in the retracting direction D2).

As thus described, basically, the wall portion 22*a* of the accommodating chamber 22 is in contact with the engagement portion 42*a* due to the biasing member 16. Accordingly, the valve body 20 and the piston 40 move integrally in the advancing and retracting direction D. It should be noted that, as described below, when a predetermined condition is satisfied, the valve body 20 moves relative to the piston 40 in the retracting direction D2.

It should be noted that, as shown in FIG. 2A and FIG. 2B, the aforementioned communication passage 21 extends in the retracting direction D2 from an end surface 20*b* of the advancing direction D1 side of the valve body 20, and is connected to the accommodating chamber 22. Specifically, the communication passage 21 includes a first passage 21*a* and a second passage 21*b*. The first passage 21*a* extends from the end surface 20*b* of the valve body 20 to the wall portion 22*b* of the accommodating chamber 22. The second passage 21*b* extends from an end portion of the retracting direction D2 side of the first passage 21*a* to an end surface 20*c* of the retracting direction D2 side of the valve body 20. The second passage 21*b* is a groove formed in the wall portions surrounding the accommodating chamber 22 and in the inner circumferential surface of the through-hole 23.

Next, position control of the valve body 20 of the flow control valve 1A is described. In the present embodiment, the controller 34 performs feedback control of the electric motor 31, such that the rotational angle of the output shaft 32 detected by the position detector 33 is adjusted to a rotational angle corresponding to a predetermined target distance between the valve seat S and the valve body 20 (i.e., corresponding to a predetermined target flow rate).

To be more specific, in the present embodiment, since the linear motion conversion mechanism 50 converts a rotation amount of the output shaft 32 into a linear motion displacement of the piston 40 in the advancing and retracting direction D, the position of the piston 40 is adjusted to a position corresponding to the rotational angle of the output shaft 32. Also, as previously described, the valve body 20 and the piston 40 move integrally in the advancing and retracting direction D. Accordingly, the valve body 20 moves in the advancing and retracting direction D by a linear motion displacement corresponding to a rotation amount of the output shaft 32.

Thus, in the present embodiment, positioning of the valve body 20 can be performed by the feedback control, by the controller 34, of the rotational angle of the output shaft 32 of the electric motor 31. A particular point on the piston 40 (e.g., the distal end of the piston 40 in the advancing direction D1) is defined as a reference point. The controller 34 performs feedback control of the electric motor 31 to bring the position of the reference point to a target position corresponding to the predetermined target flow rate.

In the present embodiment, in the case of bringing the flow control valve 1A into the valve-closed state, as shown in FIG. 2A, the controller 34 performs position control of the piston 40 to bring the position of the piston 40 to such a position that the valve body 20 is in contact with the valve seat S and that the wall portion 22a is in contact with the engagement portion 42a.

Also, in the case of controlling the flow rate out of the outlet passage 12 to a predetermined flow rate by opening the flow control valve 1A as shown in FIG. 2B, the controller 34 performs feedback control of the electric motor 31 to bring the piston 40 to a position corresponding to the predetermined target distance between the valve seat S and the valve body 20 (i.e., corresponding to the predetermined target flow rate).

Further, in the valve-closed state shown in FIG. 2A, when the fluid pressure in the inlet passage 11 becomes lower than the fluid pressure in the outlet passage 12, the flow control valve 1A according to the present embodiment exerts an anti-cavitation function. The anti-cavitation function is the function of spacing the valve body 20 apart from the valve seat S to replenish the inlet passage 11 with a hydraulic liquid from the outlet passage 12, thereby preventing the fluid pressure in the inlet passage 11 from becoming a negative pressure.

Hereinafter, the anti-cavitation function of the flow control valve 1A is described with reference to FIG. 2A and FIG. 3.

In the valve-closed state shown in FIG. 2A, the valve body 20 is in the state of being pressed against the valve seat S by the biasing force of the biasing member 16 and a force that is exerted due to the difference between the force applied to the valve body 20 in the advancing direction D1 by the fluid pressure and the force applied to the valve body 20 in the retracting direction D2 by the fluid pressure. At a normal time, the fluid pressure in the inlet passage 11 is higher than the fluid pressure in the outlet passage 12, and in this case, the engagement portion 42a is kept in contact with the wall portion 22a.

However, for example, in the case of using the flow control valve 1A for controlling a hydraulic cylinder configured to drive an element to which its own weight is applied, for example, at the time of performing boom lowering of an excavator, if the supply flow rate to the hydraulic cylinder is insufficient, then the higher-lower relationship between the inlet pressure and the outlet pressure of the flow control valve 1A may become reversed, and as a result, the inlet pressure may become lower than the outlet pressure. In such a case, of the forces applied to the valve body 20, the force applied to the valve body 20 in the retracting direction D2 as a result of the tapered surface 20a of the valve body 20 receiving the fluid pressure of the outlet passage 12 becomes relatively great.

Figure 3:
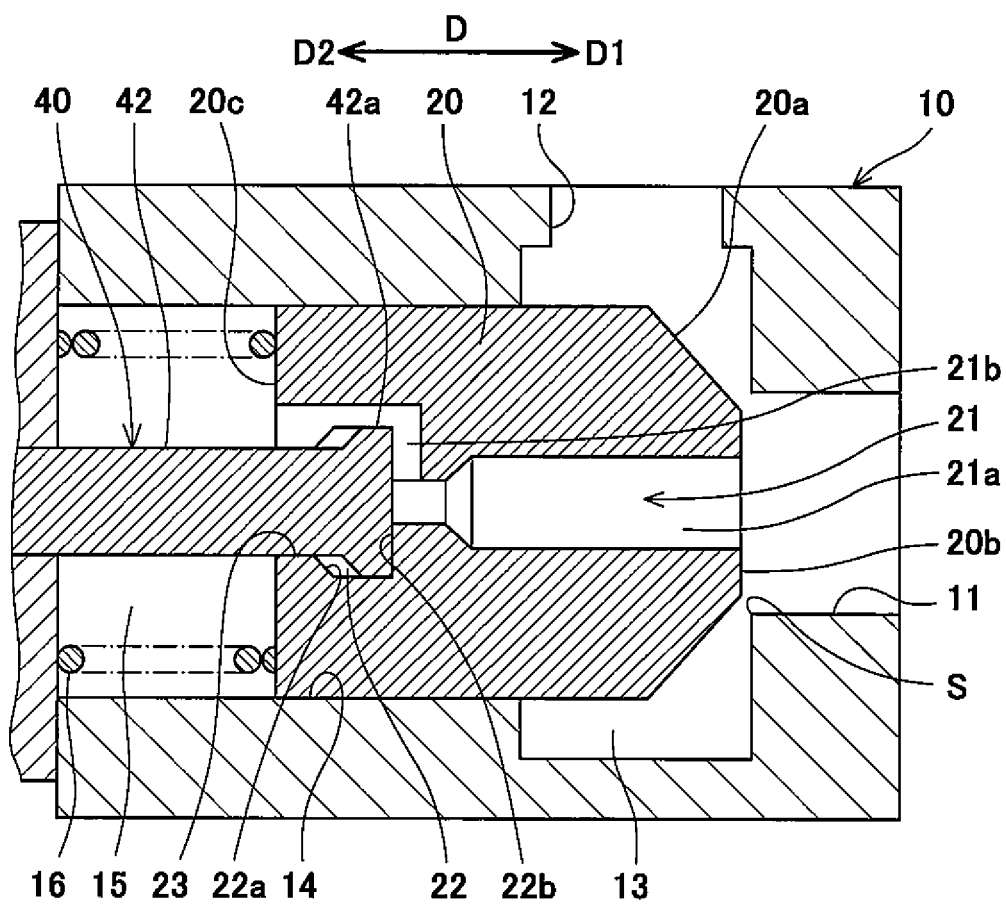
FIG. 3 is a diagram for describing an anti-cavitation function of the poppet-type flow control valve shown in FIG. 1.

When the fluid pressure in the inlet passage 11 thus becomes lower than the fluid pressure in the outlet passage 12 and the force applied to the valve body 20 in the retracting direction D2 becomes greater than the force applied to the valve body 20 in the advancing direction D1, the wall portion 22a becomes spaced apart from the engagement portion 42a and the valve body 20 moves in the retracting direction D2 relative to the piston 40 as shown in FIG. 3. In this manner, the inlet passage 11 can be replenished with the fluid from the outlet passage 12.

It should be noted that, in the present embodiment, the tapered surface 20a of the valve body 20 receives the fluid pressure of the outlet passage 12, and thereby the force is applied to the valve body 20 in the retracting direction D2. However, the valve body 20 is not limited to one having a tapered surface 20a, but may be configured differently, so long as the valve body 20 is configured to receive the fluid pressure of the outlet passage 12 such that, overall, a force is applied to the valve body 20 in the retracting direction D2.

As described above, according to the flow control valve 1A of the present embodiment, positioning of the valve body 20 is performed by the feedback control of the electric motor 31. This makes it possible to achieve highly precise positioning of the valve body 20 relative to the valve seat S. In particular, the flow control valve 1A according to the present embodiment is capable of performing highly precise positioning of the valve body S in a highly responsive manner even under a high pressure and high flow rate condition where the flow control valve 1A tends to be affected by the influence of the flow force. For instance, even when the flow control valve 1A is used in a high pressure and high flow rate application, for example, as a main control valve of a construction machine (typically a hydraulic excavator), the flow control valve 1A can control the flow rate with high precision.

Incidentally, one conceivable method of positioning the valve body by using an electric motor is to perform the positioning of the valve body in accordance with the number of input pulses by using a stepping motor. However, stepping motors have the problem of stationary angle errors that are caused due to, for example, the mechanical precision of the stator and rotor and variation in the resistance of the stator winding. Therefore, with a stepping motor, it is difficult to perform highly precise positioning of the valve body unlike the present embodiment. Further, in the present embodiment, the position detector 33 used for the rotation control of the electric motor 31, which is a servomotor, is used also for the positioning of the valve body 20. This makes it possible to realize the positioning of the valve body 20 with a simple configuration.

Further, in the present embodiment, the fluid pressure in the inlet passage 11 and the fluid pressure in the back pressure chamber 15 are equalized by the communication passage 21. Accordingly, a force against the force applied to the valve body 20 in the retracting direction D2 by the fluid pressure in the inlet passage 11 can be applied to the valve body 20 in the advancing direction by the fluid pressure in the back pressure chamber 15, which is equal to the fluid pressure in the inlet passage 11. This makes it possible to reduce a necessary thrust of the electric motor 31 for causing the valve body 20 to act in the advancing direction D1, for example, a necessary thrust of the electric motor 31 for bringing the valve body 20 into contact with the valve seat S.

Still further, the valve housing 10 and the valve body 20 are formed such that the pressure receiving area S1 on the back pressure chamber 15 side of the valve body 20 is greater than the pressure receiving area S2 on the inlet passage 11 side of the valve body 20 when the valve body 20 is in contact with the valve seat S. Accordingly, when the valve body 20 is in contact with the valve seat S, the force applied to the valve body 20 in the advancing direction D1 by the fluid pressure in the back pressure chamber 15 can be made greater than the force applied to the valve body 20 in the retracting direction D2 by the fluid pressure in the inlet passage 11. Consequently, even though the valve seat S is provided around the opening of the inlet passage 11 to the valve chamber 13, the valve body 20 can be caused to act in the advancing direction D1 by the fluid pressure in the back pressure chamber 15. Therefore, the valve-closed state can be kept by the fluid pressure in the back pressure chamber 15 without driving the electric motor 31. As a result, keeping the valve-closed state does not require a thrust of the electric motor 31. This makes it possible to reduce electric power consumption. Still further, in the case of the flow control valve 1A, the biasing force of the biasing member 16 can be reduced compared to a flow control valve that is configured such that the pressure receiving area on the back pressure chamber side of the valve body is equal to the pressure receiving area on the inlet passage side of the valve body when the valve body is in contact with the valve seat.

Still further, in the present embodiment, the communication passage 21 is formed in the valve body 20. This makes it possible to simplify the configuration of the valve housing 10 and prevent the overall flow control valve 1A from becoming large-sized.

Embodiment 2

Figure 4:
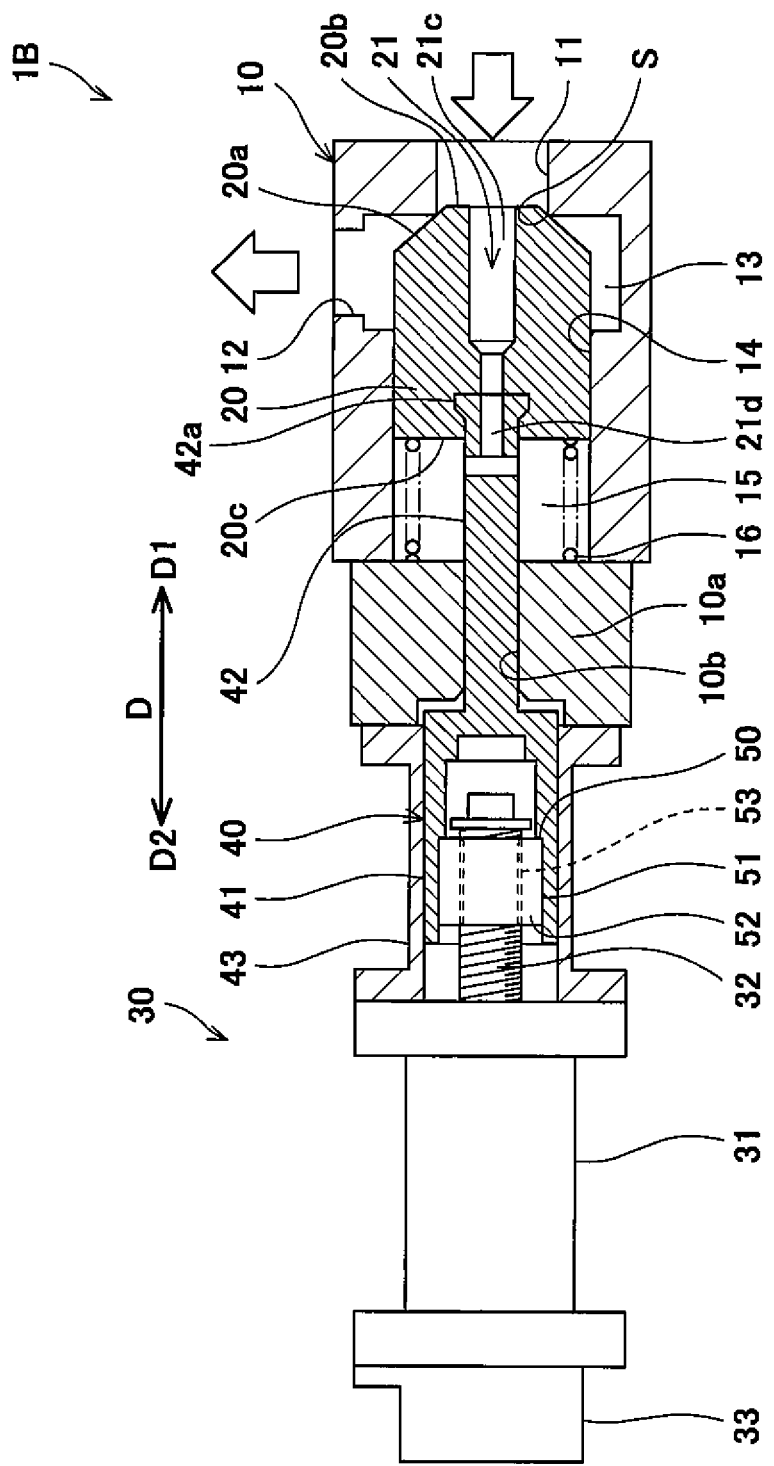
FIG. 4 shows a schematic configuration of a poppet-type flow control valve according to Embodiment 2 of the present invention.

Next, a flow control valve 1B according to Embodiment 2 is described with reference to FIG. 4. It should be noted that in Embodiment 2 and the following Embodiment 3, the same components as those described in Embodiment 1 are denoted by the same reference signs as those used in Embodiment 1, and repeating the same descriptions is avoided below. In FIG. 4 to FIG. 7 referred to in the description below, the illustration of the controller 34 is omitted.

In the flow control valve 1B of the present embodiment, no gap is formed between the shaft portion 42 and both sides of the engagement portion 42a in the advancing and retracting direction D, and the valve body 20 and the piston 40 are not movable relative to each other, but move integrally whenever they move.

In the present embodiment, part of the communication passage 21 is formed also in the shaft portion 42 of the piston 40. Specifically, in the present embodiment, the communication passage 21 includes: a valve-body-side passage 21c formed in the valve body 20; a shaft-portion-side passage 21d formed in the shaft portion 42 and connected to the valve-body-side passage 21c. The valve-body-side passage 21c extends from the end surface 20b of the valve body 20 to an end portion of the advancing direction D1 side of the shaft portion 42. The shaft-portion-side passage 21d extends from the end portion of the advancing direction D1 side of the shaft portion 42 in the retracting direction D2 inside the shaft portion 42, and then extends radially to the outer circumferential surface of the shaft portion 42 facing the back pressure chamber 15.

Also in the present embodiment, similar to Embodiment 1, positioning of the valve body 20 is performed by feedback control of the electric motor 31. Therefore, positioning of the valve body 20 relative to the valve seat S can be performed with high precision.

It should be noted that, in the present embodiment, the communication passage 21, through which the inlet passage 11 and the back pressure chamber 15 communicate with each other, includes the shaft-portion-side passage 21d. However, the communication passage 21 is not thus limited. For example, the communication passage 21 may be formed only in the valve body 20. To be specific, by providing the communication passage 21 at a position that is shifted from the center axis of the valve body 20, the inlet passage 11 and the back pressure chamber 15 may be allowed to communicate with each other without forming a passage in the shaft portion 42.

It should be noted that, in the present embodiment, the valve body 20 and the piston 40 are not movable relative to each other. Even though such a configuration is adopted, by using a mechanism that has low resistance in both the advancing and retracting directions as the linear motion conversion mechanism 50, the present embodiment can have an anti-cavitation function that provides the same advantageous effects as those of Embodiment 1. Specifically, assume that when the flow control valve 1B is closed, the higher-lower relationship between the inlet pressure and the outlet pressure of the flow control valve 1B is reversed, and consequently, the inlet pressure becomes lower than the outlet pressure and the force applied in the retracting direction D2 becomes relatively great. In this case, the valve body 20 and the piston 40 integrally make relative movement in the retracting direction D2. In this manner, the inlet passage 11 can be replenished with the fluid from the outlet passage 12.

Embodiment 3

Figure 5:
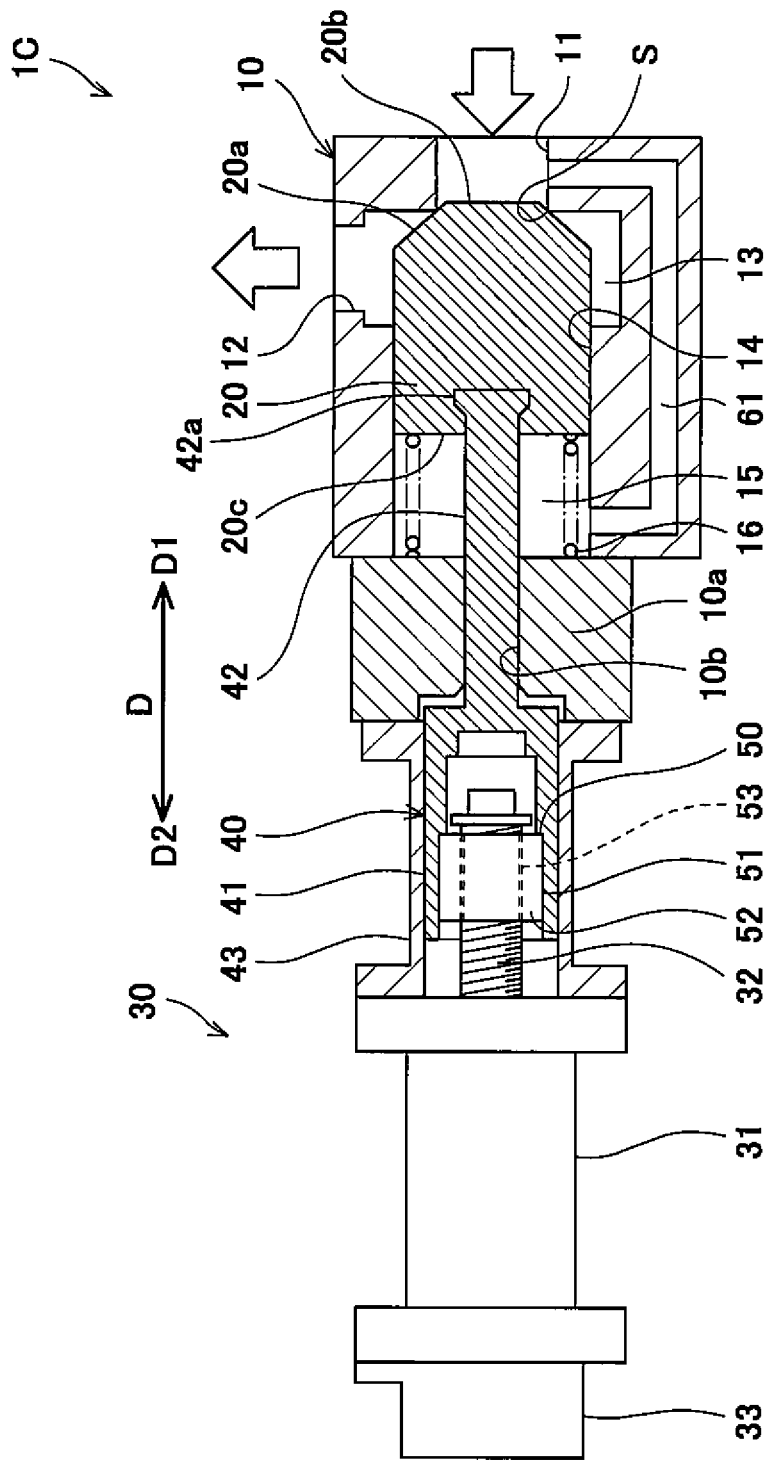
FIG. 5 shows a schematic configuration of a poppet-type flow control valve according to Embodiment 3 of the present invention.

Next, a flow control valve 1C according to Embodiment 3 is described with reference to FIG. 5.

The flow control valve 1C of the present embodiment is the same as Embodiment 2 except the method of bringing the inlet passage 11 and the back pressure chamber 15 into communication with each other and also the following point: in the flow control valve 1C of the present embodiment, a communication passage 61, through which the inlet passage 11 and the back pressure chamber 15 communicate with each other when the valve body 20 is in contact with the valve seat S, is formed not in the valve body 20 but in the valve housing 10.

Also in the present embodiment, similar to Embodiment 1, positioning of the valve body 20 is performed by feedback control of the electric motor 31. Therefore, positioning of the valve body 20 relative to the valve seat S can be performed with high precision.

Embodiment 4

Figure 6:
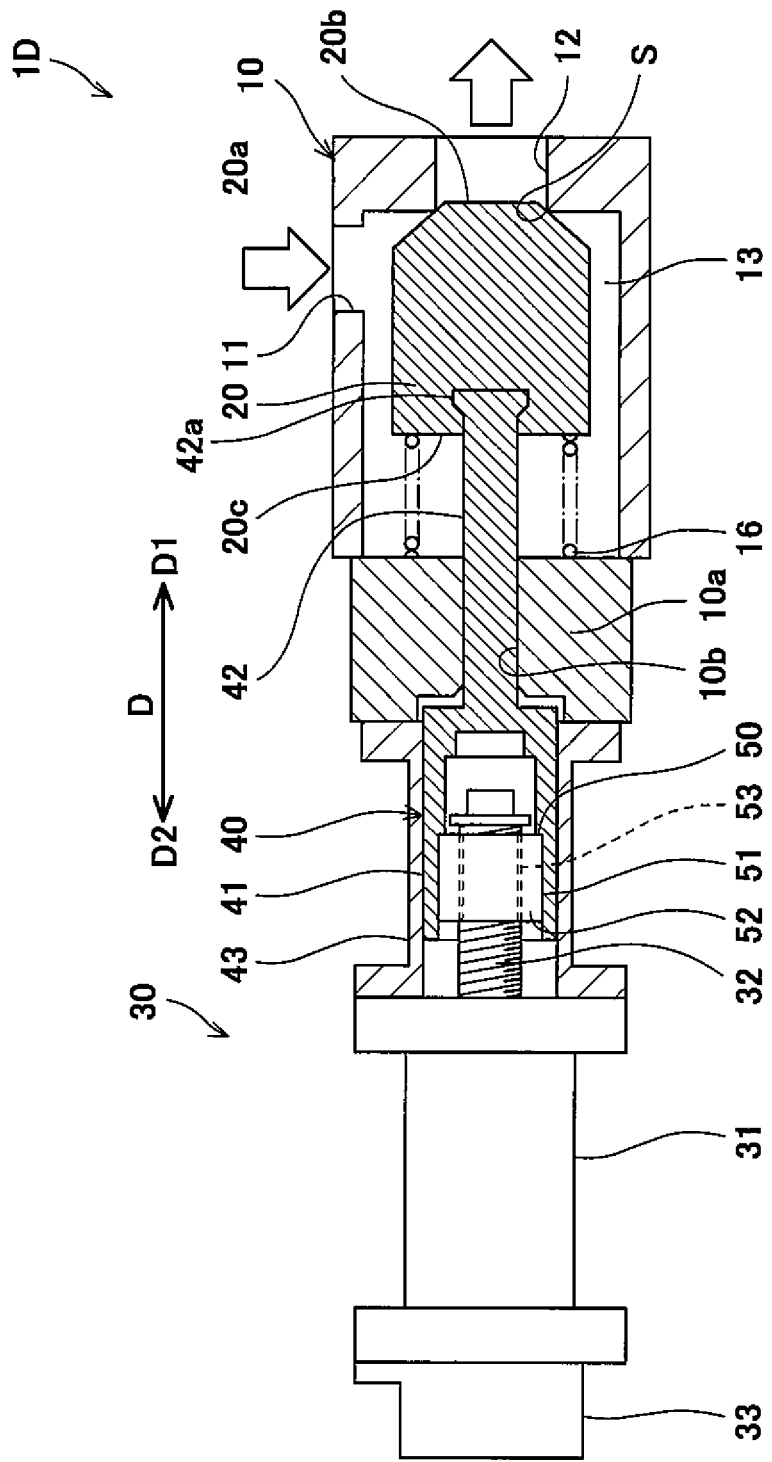
FIG. 6 shows a schematic configuration of a poppet-type flow control valve according to Embodiment 4 of the present invention.

Next, a flow control valve 1D according to Embodiment 4 is described with reference to FIG. 6.

The present embodiment is different from the flow control valves 1A to 1C of the above-described embodiments in terms of the position of the inlet passage 11 and the position of the outlet passage 12 in the valve housing 10. To be more specific, the inlet passage 11 extends from the valve chamber 13 in a direction orthogonal to the advancing direction D1 of the valve body 20, and the outlet passage 12 extends from the valve chamber 13 in the advancing direction D1 of the valve body 20. The valve seat S is provided not around an opening of the inlet passage 11 to the valve chamber 13, but around an opening of the outlet passage 12 to the valve chamber 13. Accordingly, as a result of the valve body 20 coming into contact with the valve seat S, the outlet passage 12 is sealed from the valve chamber 13.

Further, in the present embodiment, unlike the flow control valves 1A to 1C of the above-described embodiments, the valve body 20 is not supported by the sliding surface 14 in the valve housing 10, and a gap is provided between the radially outer circumferential surface of the valve body 20 and the inner wall of the valve housing 10. For this reason, in the present embodiment, the back pressure chamber 15 partitioned off from the valve chamber 13 is not present in the valve housing 10, and the valve chamber 13 is formed so as to accommodate the entire valve body 20.

Also in the present embodiment, similar to Embodiment 1, positioning of the valve body 20 is performed by feedback control of the electric motor 31. Therefore, positioning of the valve body 20 relative to the valve seat S can be performed with high precision.

Embodiment 5

Figure 7:
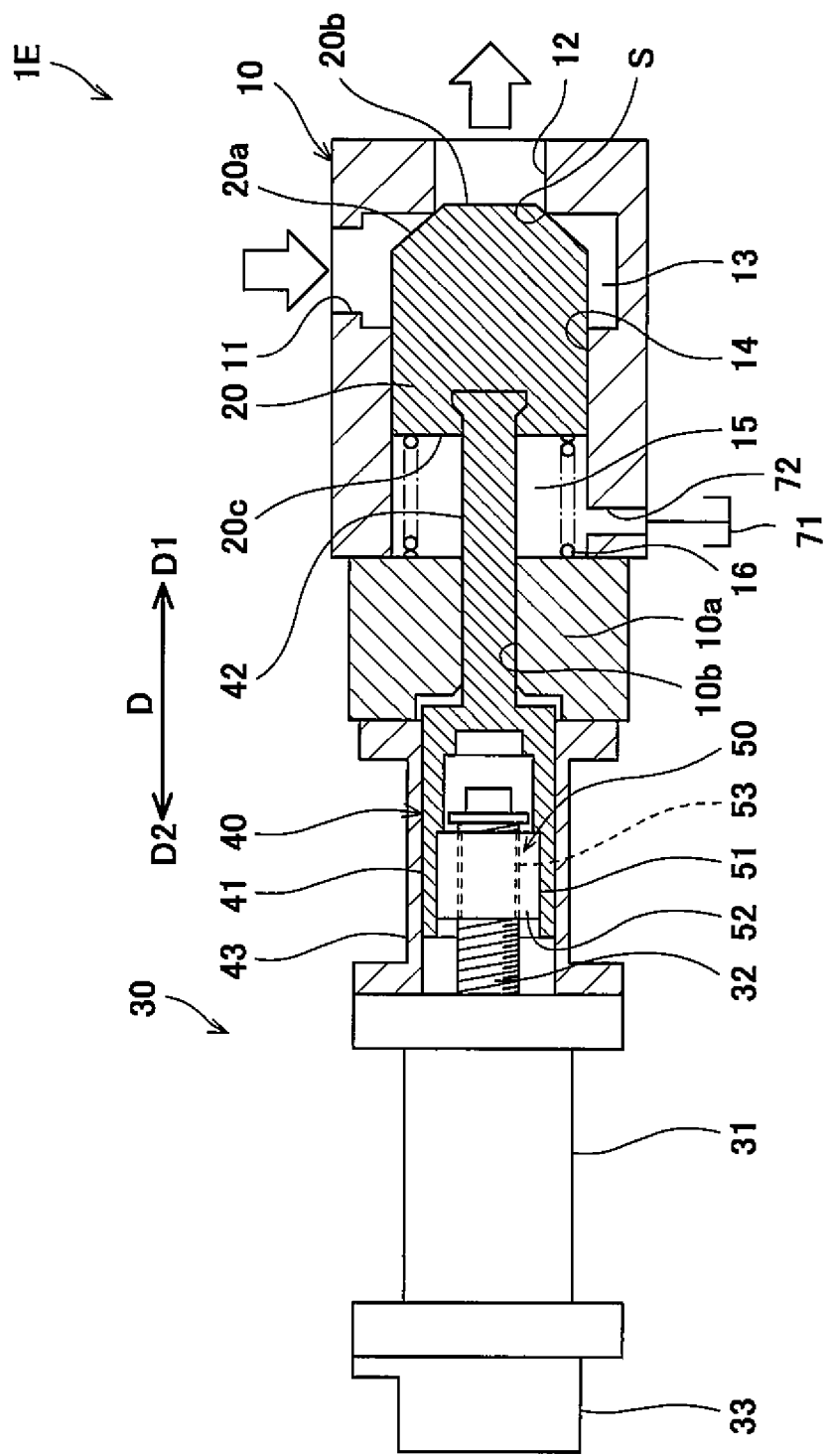
FIG. 7 shows a schematic configuration of a poppet-type flow control valve according to Embodiment 5 of the present invention.

Next, a flow control valve 1E according to Embodiment 5 is described with reference to FIG. 7.

In the present embodiment, the position of the inlet passage 11 and the position of the outlet passage 12 in the valve housing 10 are the same as those in Embodiment 4.

A communication passage 72, through which the back pressure chamber 15 and an external tank 71 communicate with each other, is formed in the valve housing 10. Owing to the communication passage 72, the fluid pressure in the outlet passage 12 and the fluid pressure in the back pressure chamber 15 are substantially equal to each other. However, the fluid pressure in the inlet passage 12 is applied to the valve body 20 (in the present embodiment, the tapered surface 20a) in the retracting direction D2. Therefore, in order to keep the valve-closed state, it is necessary to set the biasing force of the biasing member 16 to be greater than the force generated by the fluid pressure. Alternatively, the valve-closed state may be kept by always driving the electric motor 31.

Also in the present embodiment, similar to Embodiment 1, positioning of the valve body 20 is performed by feedback control of the electric motor 31. Therefore, positioning of the valve body 20 relative to the valve seat S can be performed with high precision.

Other Embodiments

The present invention is not limited to the above-described embodiments and variations. Various modifications can be made without departing from the scope of the present invention.

For example, the configurations according to Embodiments 1 to 5 can be suitably combined.

As one example, in the flow control valves 1A to 1C according to Embodiments 1 to 3, the position of the inlet passage 11 and the position of the outlet passage 12 in the valve housing 10 may be reversed with each other. That is, in the flow control valves 1A to 1C according to Embodiments 1 to 3, the inlet passage 11 may extend from the valve chamber 13 in the direction orthogonal to the advancing direction D1 of the valve body 20, and the outlet passage 12 may extend from the valve chamber 13 in the advancing direction D1 of the valve body 20. Also in the flow control valves 1D and 1E according to Embodiments 4 and 5, the position of the inlet passage 11 and the position of the outlet passage 12 in the valve housing 10 may be reversed with each other. That is, in the flow control valves 1D and 1E according to Embodiments 4 and 5, the inlet passage 11 may extend from the valve chamber 13 in the advancing direction D1 of the valve body 20, and the outlet passage 12 may extend from the valve chamber 13 in the direction orthogonal to the advancing direction D1 of the valve body 20. For example, in the flow control valve 1A according to Embodiment 1, if the inlet passage 11 extends in the direction orthogonal to the advancing direction D1 and the outlet passage 12 extends in the advancing direction D1, then, for example, one end portion of the communication passage 21 may be provided not in the end surface 20b but in the outer circumferential surface of the valve body 20, such that when the valve body 20 is in contact with the valve seat S, the communication passage 21 allows the inlet passage 11 and the back pressure chamber 15 to communicate with each other.

Further, in the above-described Embodiments 1 to 3, the pressure receiving area S1 on the back pressure chamber 15 side of the valve body 20 is greater than the pressure receiving area S2 on the inlet passage 11 side of the valve body 20 when the valve body 20 is in contact with the valve seat S. However, the present invention is not thus limited. For example, the pressure receiving areas S1 and S2 may be equal to each other. In this case, for example, the valve-closed state may be kept by the biasing force of the biasing member 16. Also, for example, in a case where the valve body 20 is engaged with the piston 40 in a manner to be unmovable relative to the piston 40 as in Embodiments 2 to 5 and the anti-cavitation function is not required, the valve-closed state may be kept by driving the electric motor 31 in addition to or instead of utilizing the biasing force of the biasing member 16.

Although the communication passage 21 formed in the valve body 20 is connected to the accommodating chamber 22 in Embodiment 1, the communication passage of the present invention is not thus limited. For example, the communication passage need not be connected to the accommodating chamber 22, but may be formed at the radially outer side of the accommodating chamber 22 in a manner to extend straight in the advancing and retracting direction D.

In Embodiment 3, the communication passage 61 for equalizing the fluid pressure in the back pressure chamber 15 and the fluid pressure in the inlet passage 11 to each other is formed in the valve housing 10. Alternatively, outside the valve housing 10, a passage for equalizing the fluid pressure in the back pressure chamber 15 and the fluid pressure in the inlet passage 11 to each other may be provided separately.

Further, the configuration for exerting the anti-cavitation function according to Embodiment 1 is not limited to the one shown in FIG. 1 to FIG. 3. For example, the engagement portion provided on the shaft portion 42 of the piston 40 may be formed such that the engagement portion is recessed radially inward.

Still further, in Embodiment 1, when the valve body 20 is spaced apart from the valve seat S, if the engagement portion 42a can be kept in contact with the wall portion 22a (contact portion) by any means different from the biasing member 16, for example, by adjusting the pressure in the back pressure chamber 15 to be higher than the pressure in the valve chamber 13, then the biasing member 16 may be eliminated. Also in Embodiments 2 to 5, the biasing member 16 may be eliminated.

Still further, in Embodiments 1 to 5 described above, the biasing member 16 is provided in the back pressure chamber 15. However, the position of the biasing member 16 is not thus limited. For example, a gap may be formed between the inner circumferential surface of the cylinder 43 and the outer circumferential surface of the piston 40, and in the gap, the biasing member 16 may be provided such that the biasing force of the biasing member 16 is applied to the piston 40 in the advancing direction D1.

REFERENCE SIGNS LIST 1A to 1E: flow control valve
10: valve housing
11: inlet passage
12: outlet passage
13: valve chamber
15: back pressure chamber
16: biasing member
20: valve body
21: communication passage
22a: wall portion (contact portion)

31: electric motor
32: output shaft
33: position detector
34: controller
40: piston (movable member)
42: shaft portion
42a: engagement portion
50: linear motion conversion mechanism
D: advancing and retracting direction
D1: advancing direction
D2: retracting direction
S: valve seat
S1: pressure receiving area
S2: pressure receiving area
g: gap

The invention claimed is:

1. A poppet valve for flow control comprising:
a valve housing including an inlet passage, an outlet passage, a valve chamber provided between the inlet passage and the outlet passage, and a valve seat provided in the valve chamber;
a valve body accommodated in the valve housing and configured to advance and retract relative to the valve seat;
a movable member configured to move integrally with the valve body in an advancing and retracting direction, in which the valve body advances and retracts;
an electric motor;
a position detector configured to detect a rotational angle of an output shaft of the electric motor;
a linear motion conversion mechanism configured to convert a rotation amount of the output shaft of the electric motor into a linear motion displacement of the movable member in the advancing and retracting direction;
a controller configured to perform feedback control of the electric motor, such that the rotational angle of the output shaft, which is detected by the position detector, is adjusted to a rotational angle corresponding to a predetermined target distance between the valve seat and the valve body;
a back pressure chamber formed in the valve housing, such that the back pressure chamber is positioned to the retracting direction side of the valve body and is partitioned off from the valve chamber by the valve body;
a communication passage through which the inlet passage and the back pressure chamber communicate with each other, the communication passage being configured to equalize a fluid pressure in the inlet passage and a fluid pressure in the back pressure chamber to each other; and
a biasing member configured to apply a biasing force to the valve body in the advancing direction, wherein
when a fluid pressure in the inlet passage becomes lower than a fluid pressure in the outlet passage and a force applied to the valve body in the retracting direction becomes greater than a force applied to the valve body in the advancing direction, the valve body moves in the retracting direction relative to the movable member.

2. The poppet valve for flow control according to claim 1, wherein
the movable member includes an engagement portion configured to be engaged with the valve body,
the valve body includes a contact portion configured to be contacted by the engagement portion from the advancing direction side,
when the fluid pressure in the inlet passage is higher than the fluid pressure in the outlet passage, the engagement portion is kept in contact with the contact portion, and
when the fluid pressure in the inlet passage becomes lower than the fluid pressure in the outlet passage and the force applied to the valve body in the retracting direction becomes greater than the force applied to the valve body in the advancing direction, the contact portion becomes spaced apart from the engagement portion, and the valve body moves in the retracting direction relative to the movable member.

* * * * *